United States Patent [19]

Hagino

[11] 4,100,465
[45] Jul. 11, 1978

[54] TURNTABLE SPEED CONTROL SYSTEM

[75] Inventor: Shunji Hagino, Shikoda Kashiwa, Japan

[73] Assignee: RCA Corporation, New York, N.Y.

[21] Appl. No.: 817,343

[22] Filed: Jul. 20, 1977

[30] Foreign Application Priority Data

Aug. 9, 1976 [GB] United Kingdom .............. 33121/76
Jul. 1, 1977 [GB] United Kingdom .............. 33121/76

[51] Int. Cl.² .............................................. A02P 5/46
[52] U.S. Cl. .................................. 318/41; 274/39 A
[58] Field of Search ......................... 274/39 R, 39 A; 318/138, 41

[56] References Cited

U.S. PATENT DOCUMENTS 2,999,186  9/1961  Pritchard et al. .................... 315/13
3,912,283  10/1975  Hammond et al. .................. 318/41

*Primary Examiner*—David Smith, Jr.
*Attorney, Agent, or Firm*—Eugene M. Whitacre; Joseph S. Tripoli; Dilip A. Kulkarni

[57] ABSTRACT

A motor-driven turntable supports, for rotation therewith, a concentric ring having a plurality of permanently magnetized poles of alternate polarity symmetrically disposed along its periphery. A magnetizable core includes a pair of pole pieces having spaced surfaces defining an air gap across which magnetic flux is directed when a winding on the core is energized with alternating current. The magnetizable core is fixedly mounted such that the permanently magnetized poles pass, a seriatim, through the core gap when the turntable is rotating. The magnetized ring and the energized core form a synchronizer which opposes deviations of the turntable speed from a predetermined speed corresponding to the winding energization current frequency divided by half the number of the poles. A capacitor is connected in series with the synchronizer winding for establishing a load which exhibits a resonance at the winding energization current frequency. Means, including a crystal controlled oscillator and a frequency divider, are provided for developing a square wave output at the winding energization current frequency. Means, comprising a power amplifier including transistors operating in a switching mode, are provided for applying the square wave output of the developing means to the resonant load.

3 Claims, 3 Drawing Figures

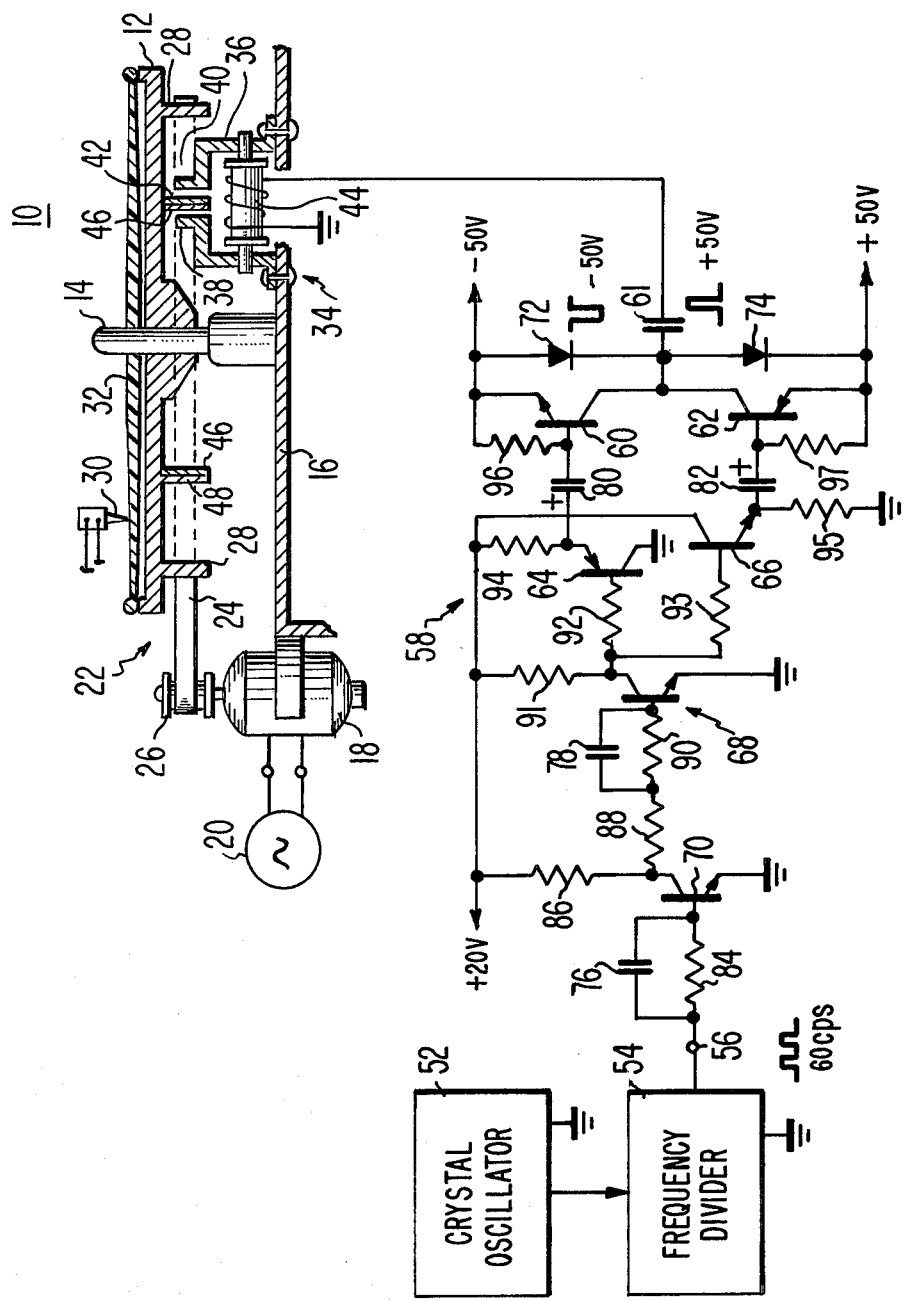

TURNTABLE SPEED CONTROL SYSTEM

The present invention generally relates to a video disc player. More particularly, this invention relates to a turntable speed control system for a video disc player.

Numerous information recording and playback systems require a turntable to be rotated at a precise speed for proper operation. For example, such a requirement exists in a video disc system. In certain video disc systems, video information is recorded by means of geometric variations in the bottom of a smooth spiral groove on the surface of a disc record. The record surface includes a coating of conductive material which is preferably covered with a thin deposit of dielectric materail. A pickup stylus engages the spiral groove and includes a conductive surface which, together with the conductive coating and dielectric deposit of the record, form a capacitor. When the record is rotated, an edge of the conductive surface of the pickup stylus, while riding in the groove, recovers capacitive variations due to the geometric variations therein. The capacitive variations, indicative of prerecorded video information, are applied to a suitable signal processing circuit and electrical signals obtained therefrom are then coupled to a conventional television receiver for reproduction. The variable capacitor concept, as applied to video disc systems, is described in detail in the U.S. Pat. No. 3,842,194, issued on Oct. 15, 1974 to Jon K. Clemens.

In video disc systems of the aforementioned Clemens type, it has been recognized that, not only the average speed of relative motion between the record and the pickup stylus must be maintained at a predetermined speed (e.g., 7.5 rps) but the speed variation about the average speed must be maintained within specified tolerance limits (e.g., ±0.01 percent) to obtain accurate reproduction of the prerecorded signals. The predetermined speed and the specified tolerance limits are also necessary to assure that the horizontal and vertical synchronizing information is stable and within the lockup range of the deflection circuits of the television receiver. Moreover, when the prerecorded information is a color television signal, with chrominance information recorded as a modulated carrier signal, the recovered signal must be stable and within the lockup range of the color processing circuits of the playback system in order to minimize phase distortion.

In U.S. Pat. No. 3,912,283, issued on Oct. 14, 1975 to Robert J. Hammond, et al., a turntable speed control system is disclosed which permits highly accurate maintenance of a turntable's rotational speed at a desired speed, despite load variations, parts wear, line voltage variations, etc. In the disclosed system, a motor-driven turntable supports, for rotation therewith, an even-number plurality of permanent magnets (e.g., 16) symmetrically disposed along the periphery of a ring, concentric with the center of rotation of the turntable, with alternating polarity (i.e., with every other magnet poled to present a north pole at its inner, center-facing surface, and with the intervening magnets oppositely poled). A fixedly mounted core of magnetizable material includes a pair of pole pieces having spaced surfaces which form an air gap, across which magnetic flux is directed when a winding on the core is energized with alternating current (e.g., 60 cps). The core gap is positioned to receive the ring so that the permanent magnets pass in succession through the air gap when the turntable is rotating. The rotating magnet ring and the energized core form a synchronizer which opposes any departures of the turntable speed from a rotational frequency (e.g., 7.5 rps) corresponding to the frequency of the winding energization current (e.g., 60 cps) divided by half the number of the ringed magnets (e.g., 8). The coupling between the drive motor (e.g., a synchronous motor) and the turntable is desirably such as to permit, when necessary an asynchronous relationship between the respective rates of rotation. Illustratively, this characteristic is provided by utilizing a non-slip belt drive for transmitting motion from a motor shaft supported pulley to the turntable with the drive belt formed of a yieldable material permitting belt deformation to accommodate asynchronous rotational conditions. The yieldable belt drive may, for example, be of the type described in U.S. Pat. No. 3,873,365, issued on Mar. 25, 1975, to James C. Schopp, et al.

The above-described system maintains a precise relationship between the turntable rotation frequency and the winding energization current frequency with a high degree of accuracy. However, if such relationship maintenance is to result in maintenance of the absolute value of the turntable rotational frequency at a desired frequency value with a high degree of accuracy, it is essential that the source of winding energization current have a high degree of frequency stability.

In video disc playback systems (for example, of the type disclosed in the U.S. Pat. No. 3,842,194), it is typically desired that the turntable rotational frequency be held within ±0.01% of a predetermined rotational frequency value (e.g., 7.5 rps). In some areas of the world, the frequency of the house current supplied by the power distribution system (i.e., mains supply) is normally sufficiently stable that such house current may be used to energize the synchronizer winding, with assurance that the synchronizer will maintain the turntable rotational frequency within the indicated ±0.01% deviation limits. However, in other areas of the world, the frequency stability of the power line system is sufficiently poor (e.g., ±0.25%) that the rotational frequency stability desired for video disc playback cannot be assured by the above-described synchronizer approach when house current is employed for core winding energization.

The present invention is concerned with the provision of a turntable speed control system wherein the above-described synchronizer approach may be employed to obtain a high degree of turntable rotational frequency stability (e.g., of the order of ±0.01% or better, as desired for video disc playback operations), with substantial independence of the frequency instabilities that may be associated with the power distribution system in the area where the turntable is operated.

Pursuant to an illustrative embodiment of the present invention, an oscillator, crystal controlled for operation at a frequency which is a plurality of orders of magnitude greater than the rotational frequency desired, but which is harmonically related thereto, is used in conjunction with a frequency divider (illustratively, of the digital type) to develop a square wave output, with the fundamental frequency of the square wave output corresponding to a selected integral multiple of the desired turntable rotational frequency. The square wave output of the frequency divider is applied to a power amplifier (illustratively, of a push-pull type), employing power transistors operating in a switching mode. The power amplifier is provided with a resonant load, comprising the synchronizer winding in circuit with a capacitor of a value selected to cause the load circuit to exhibit resonance at the fundamental frequency of the square wave output of the frequency divider. The number of oppositely poled magnet pairs symmetrically disposed on the synchronizer's magnet ring periphery corresponds to the multiplying integer that relates the square wave's fundamental frequency to the desired turntable rotational frequency. A synchronous motor, energized by alternating current derived from the local power line system, supplies drive to the turntable (illustratively, via a belt drive system of the yieldable belt type previously described).

In an illustrative example of use, a turntable speed control system of the type just described has been successfully employed in obtaining a turntable rotational frequency stability of the order of ±0.002%, during operations in an area where the frequency stability of the power line system was of the order of ±0.25%.

In the accompanying drawings:

FIG. 1 is a schematic diagram illustrating a video disc player incorporating a turntable speed control system pursuant to the principles of the present invention.

FIG. 2 shows a magnet ring having an even-number plurality of permanent magnets disposed symmetrically along its periphery which is suitable for use in the turntable speed control system of FIG. 1.

Figure 3:
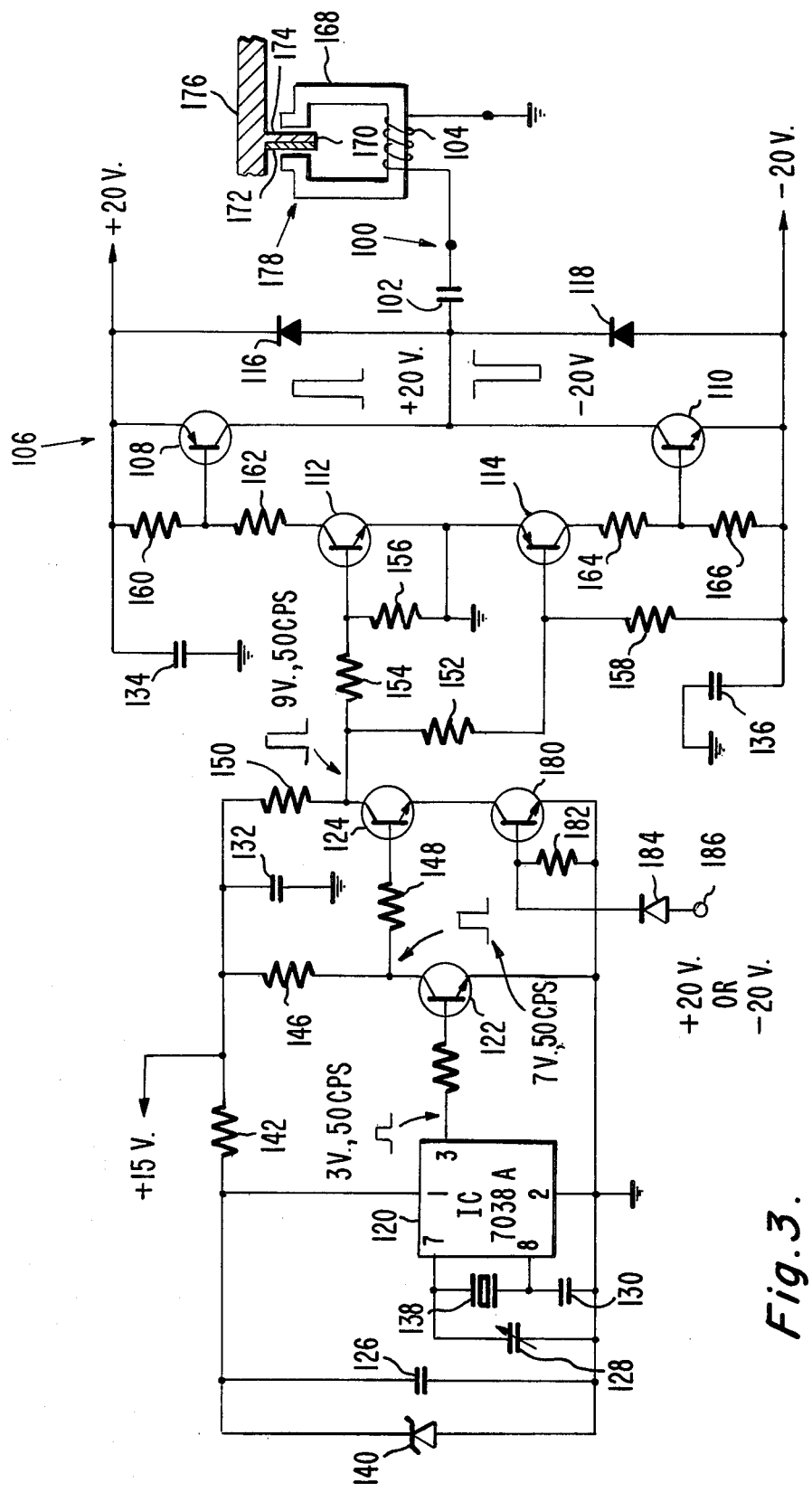
FIG. 3 represents another embodiment of the turntable speed control system in accordance with the present invention.

Illustrated in FIG. 1 is a video disc player 10, for example, of the type described in U.S. Pat. No. 3,842,194. As shown therein, a turntable 12 is rotatably supported by a spindle 14 fixedly secured to a mounting plate 16 of the video disc player 10. A motor 18 (illustratively, a synchronous motor), energized by an alternating current from an AC source 20 (e.g., local power line source), drives the turntable 12 by means of a belt drive system 22. The belt drive system 22 comprises a yieldable belt 24 (for example, fabricated from elastic, creepable material such as neoprene rubber, polyurethane, etc.) which encircles a motor driven pulley 26 and an outer, downwardly depending flange 28 of the turntable 12. The rotational speed of the motor 18 and the dimensions of the pulleys 26 and 28 are selected such that the turntable 12 is caused to normally rotate at a desirable predetermined speed (e.g., 7.5 rps).

A pickup stylus 30, riding in a smooth spiral groove of a turntable-supported video disc 32, recovers prerecorded signals, for example, in the manner described in U.S. Pat. No. 3,842,194, for subsequent application to a conventional television receiver.

A synchronizer 34, illustratively of the type disclosed in U.S. Pat. No. 3,912,283, includes a magnetizable core 36 comprising a pair of pole pieces 38 and 40 having spaced surfaces defining an air gap 42 across which magnetic flux is directed when a field winding 44 is energized with alternating current (e.g., 60 cps).

The synchronizer 34 additionally includes a magnet ring 46, of the type shown in FIG. 2, having an even-number plurality of permanently magnetized poles of alternate polarity (e.g., 16) symmetrically disposed along its periphery. The magnet ring 46 is affixed to a circular, downwardly depending flange 48 concentrically mounted on the turntable 12 for rotation therewith.

The turntable 12 and the downwardly dependent flanges 28 and 48 are preferably made from non-magnetic material.

The core 36 is fixedly secured to the mounting plate 16 such that the ringed magnets 50, shown in FIG. 2, pass, a seriatim, through the core gap 42 when the turntable 12 is rotating.

A crystal controlled oscillator 52 develops oscillations of a high frequency (illustratively, in the megahertz range) with a high degree of frequency stability. The oscillator output is applied to a frequency divider 54. The frequency divider 54 is, illustratively, of a digital type providing a square wave output at terminal 56. The oscillator frequency is desirably harmonically related to the desired turntable rotational frequency, and is chosen, together with the dividing rate of the frequency divider, so that the fundamental frequency of the square waves appearing at terminal 56 corresponds to the desired turntable rotational frequency multiplied by a small integer. In a first illustrative example, the desired rotational frequency is 7.5 Hz., the multiplying integer is eight, and the square wave fundamental frequency is 60 Hz.

The square wave signal at the terminal 56 is amplified by a cascaded pair of transistor amplifier stages, including two NPN transistors 68 and 70, for delivery to a power amplifier 58 of a push-pull, complementary symmetry type. The power amplifier 58 includes an NPN output transistor 60 and a PNP output transistor 62 driven, respectively, by a PNP driver transistor 64 and an NPN driver transistor 66. A pair of clipping diodes 72 and 74 are connected across the output transistors 60 and 62 in the manner shown in FIG. 1. The power amplifier transistors, operating in a switching mode in response to the square wave input signal, provide efficient amplification of the frequency divider output to a level suitable for the energization of the synchronizer 34. The load circuit for the power amplifier 58 comprises a resonant circuit, formed by the series combination of capacitor 61 and the synchronizer winding 44. The capacitor value is chosen so that the resonant frequency of the load circuit substantially corresponds to the fundamental frequency of the square wave output of the frequency divider 54. The resultant energizing current in the winding 44 has a substantially sinusoidal waveshape at the square wave's fundamental frequency.

The above-described system readily permits control of the rotational frequency of the turntable 12 with a frequency stability of the requisite order for video disc playback purposes (e.g., ±0.01%), even though the frequency stability of the power line source 20 is of a poorer order (e.g., ±0.25%). The use of square waves permits use of efficient switching circuitry for the requisite power amplification, while the resonating of the load circuit provides the requisite waveshaping of the winding energization current. Relatively inexpensive digital integrated circuits are readily available for the square wave generation performed by the oscillator/divider elements.

FIG. 3 provides a detailed view of circuitry for a second example of the synchronizer use, where the desired rotational frequency is 8⅓ Hz., the square wave fundamental frequency is 50 Hz., and the number of ring magnets is 12. The frequency chosen for the oscillator is 3.2768 MHz., and frequency division is by a factor of 65,536.

As shown therein, a resonant load 100 comprises a capacitor 102 connected in circuit relationship with a field winding 104. The field winding 104 energizes a synchronizer core 168.

An air gap 170 in the synchronizer core 168 is dimensioned for reception of a magnet ring 172 secured to a downwardly depending flange 174 of a turntable 176. The magnet ring 172 has a plurality of permanently magnetized poles of alternate polarity (in this embodiment, 12) disposed symmetrically along its periphery in the manner similar to the arrangement of FIGS. 1 and 2. The energized core 168 and the magnet ring 172 form a synchronizer for locking the turntable speed at the desired value (in this case, 8⅓ rps).

The resonant load 100 is supplied with the square wave output of a power amplifier 106 comprising a PNP output transistor 108 and an NPN output transistor 110 driven, respectively, by an NPN driver transistor 112 and a PNP driver transistor 114. A pair of clipping diodes 116 and 118 are connected across the output transistors 108 and 110 in the manner shown in FIG. 3.

The oscillator function and the frequency divider function is performed by an integrated circuit 120. The output of the integrated circuit 120 is amplified by a cascaded pair of transistors 122 and 124 for delivery to the power amplifier 106.

The operation of the FIG. 3 embodiment is similar to the operation of the FIG. 1 embodiment.

The arrangement of FIG. 3 additionally includes a device for disabling the power amplifier 106 when the turntable drive motor is de-energized. The disabling device includes a transistor 180 interposed between the emitter of the transistor 124 and a point of ground potential. When the turntable drive motor is switched on, a voltage of +20 volts is applied to the terminal 186, which causes the transistor 180 to be turned on thereby enabling the transistor 124. Conversely, when the turntable drive motor is switched off, a voltage of −20 volts is applied to the terminal 186 which causes the transistor 180 to be turned off, whereby the transistor 124 is disabled.

Illustratively, the values of the circuit elements shown in FIG. 1 are as follows:

(1) Capacitor 61 — 5.5 microfarads
(2) Capacitor 76 — 680 picofarads
(3) Capacitor 78 — 680 picofarads
(4) Capacitor 80 — 22 microfarad
(5) Capacitor 82 — 22 microfarad
(6) Diode 72 — VO6C
(7) Diode 74 — VO6C
(8) Resistance 84 — 2.2 Kilohms
(9) Resistance 86 — 2.7 Kilohms
(10) Resistance 88 — 2.7 Kilohms
(11) Resistance 90 — 2.7 Kilohms
(12) Resistance 91 — 2.7 Kilohms
(13) Resistance 92 — 1.0 Kilohms
(14) Resistance 93 — 1.0 Kilohms
(15) Resistance 94 — 1.5 Kilohms
(16) Resistance 95 — 1.5 Kilohms
(17) Resistance 96 — 1.2 Kilohms
(18) Resistance 97 — 1.2 Kilohms
(19) Transistor 60 — 2SC 1448
(20) Transistor 62 — 2SA 740
(21) Transistor 64 — 2SA 561
(22) Transistor 66 — 2SC 734
(23) Transistor 68 — 2SC 734
(24) Transistor 70 — 2SC 734

Illustratively, the values of the circuit elements shown in FIG. 3 are as set forth below.

(1) Capacitor 102 — 18 microfarads
(2) Capacitor 126 — 100 microfarads
(3) Capacitor 128 — 6 to 18 picofarads
(4) Capacitor 130 — 22 picofarads
(5) Capacitor 132 — 100 microfarads
(6) Capacitor 134 — 1,000 microfarads
(7) Capacitor 136 — 1,000 microfarads
(8) Crystal 138 — 3.2768 Megahertz
(9) Diode 116 — 1N4002
(10) Diode 118 — 1N4002
(11) Diode 140 — Z3.6
(12) Diode 184 — 1N914
(13) Integrated Circuit 120 — IC 7038A, Intersil
(14) Resistance 142 — 12 Kilohms
(15) Resistance 144 — 8.2 Kilohms
(16) Resistance 146 — 2.7 Kilohms
(17) Resistance 148 — 2.7 Kilohms
(18) Resistance 150 — 1.0 Kilohms
(19) Resistance 152 — 2.2 Kilohms
(20) Resistance 154 — 3.9 Kilohms
(21) Resistance 156 — 1.0 Kilohms
(22) Resistance 158 — 8.2 Kilohms
(23) Resistance 160 — 150 ohms
(24) Resistance 162 — 680 ohms
(25) Resistance 164 — 680 ohms
(26) Resistance 166 — 150 ohms
(27) Resistance 182 — BD 3.6 Kilohms
(28) Transistor 108 — 238
(29) Transistor 110 — BD 237
(30) Transistor 112 — BC 107b
(31) Transistor 114 — BC 177
(32) Transistor 122 — BC 107b
(33) Transistor 124 — BC 107b
(34) Transistor 180 — BC 107b

What is claimed is:

1. A speed control apparatus comprising:
(A) a mounting plate;
(B) a turntable secured for rotation on said mounting plate;
(C) a ring concentrically secured to said turntable for rotation therewith; said ring having a plurality of permanently magnetized poles of alternate polarity symmetrically disposed along its periphery;
(D) rotating means;
(E) variable coupling means for transferring motion of said rotating means to said turntable;
(F) a magnetizable core including a pair of pole pieces having spaced surfaces defining an air gap; said magnetizable core being fixedly secured to said mounting plate such that said permanently magnetized poles pass in succession through said core gap when said turntable is rotating;
(G) a winding for establishing an alternating magnetic field across said core gap when it is energized with alternating current;
wherein said magnetized ring and said energized core form a synchronizer for opposing any departures of the turntable speed from a predetermined speed corresponding to the frequency of the winding energization current divided by half the number of said poles;
(H) a capacitor in a circuit relationship with said core winding for establishing a load which exhibits a resonance at said winding energization current frequency;
(I) means for developing a square wave output at said winding energization current frequency; and
(J) means for applying said square wave output of said developing means to said resonant load.

2. An apparatus as defined in claim 1 wherein said applying means comprises a power amplifier including transistors operating in a switching mode.

3. An apparatus as defined in claim 1 wherein said developing means comprises:
(A) a crystal controlled oscillator operating at a frequency which is several orders of magnitude greater than, but an integral multiple of, said winding energization current frequency; and
(B) a frequency divider coupled to the output of said crystal controlled oscillator for generating said square wave output at said winding energization current frequency.

* * * * *

UNITED STATES PATENT AND TRADEMARK OFFICE
CERTIFICATE OF CORRECTION

PATENT NO. : 4,100,465

DATED : JULY 11, 1978

INVENTOR(S): Shunji Hagino, Shikoda Kashiwa

It is certified that error appears in the above-identified patent and that said Letters Patent is hereby corrected as shown below:

Column 1, line 16, that portion reading "materail" should read -- material --; Column 5, line 49, that portion reading "(10) Resistance 88 - 2.7 Kilohms" should read -- (10) Resistance 88 - 1.2 Kilohms --; Column 6, line 24, that portion reading "(27) Resistance 182 - BD 3.6 Kilohms" should read -- (27) Resistance 182 - 3.6 Kilohms --; Column 6, line 25, that portion reading "(28) Transistor 108 - 238" should read -- (28) Transistor 108 - BD 238 --.

Signed and Sealed this

Second Day of January 1979

[SEAL]

Attest:

RUTH C. MASON
Attesting Officer

DONALD W. BANNER
Commissioner of Patents and Trademarks